Figure 1:
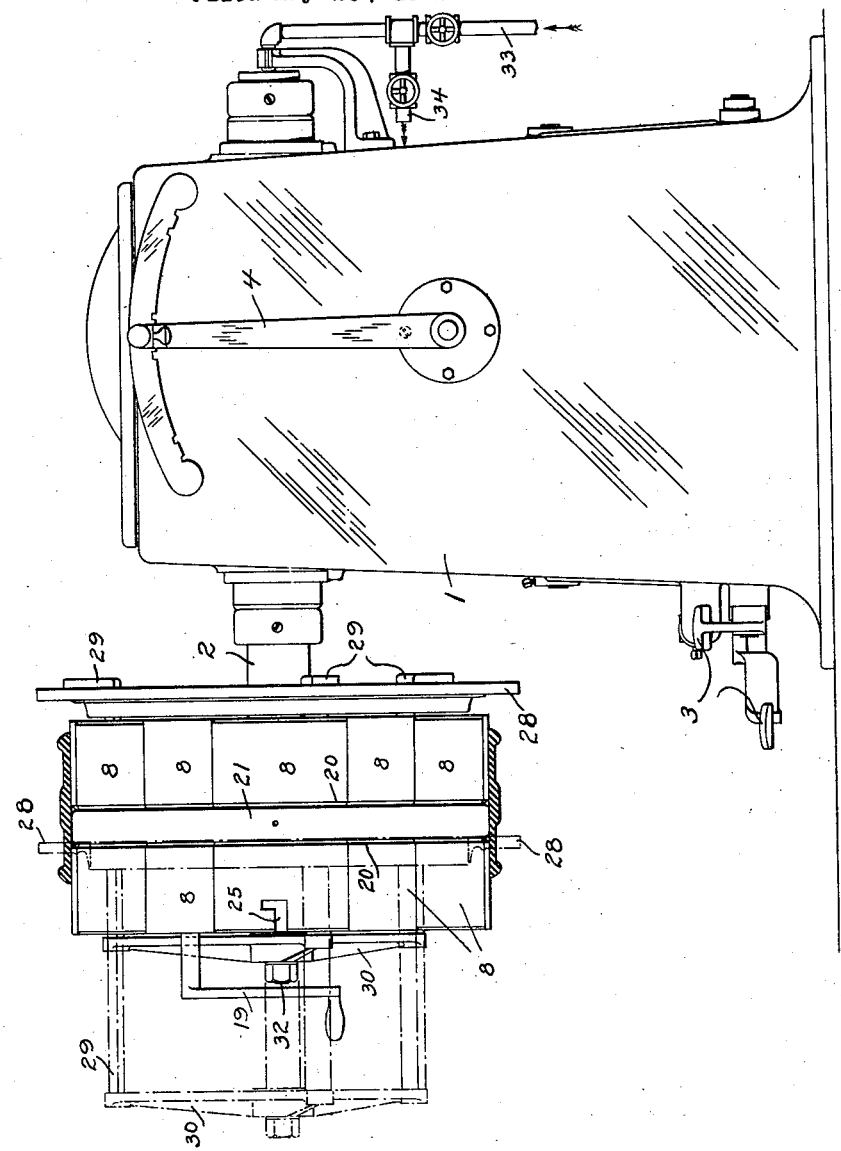

Oct. 16, 1923.                                       1,470,889
             W. J. STEINLE
     APPARATUS FOR MANUFACTURING TIRE CASINGS
           Filed May 26, 1922        3 Sheets-Sheet 1

Inventor
WILLIAM J. STEINLE
By his Attorney

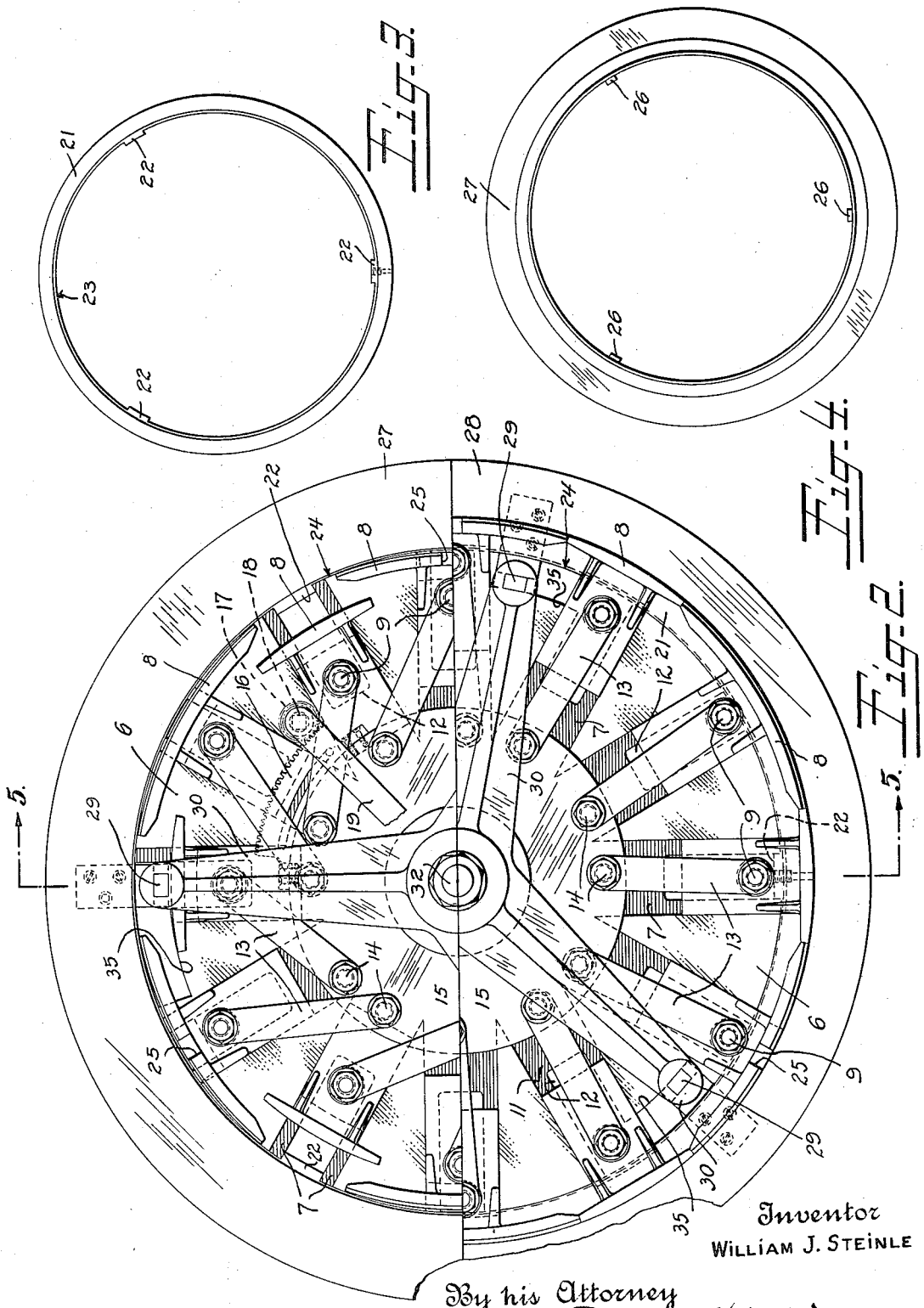

Oct. 16, 1923.
W. J. STEINLE
1,470,889
APPARATUS FOR MANUFACTURING TIRE CASINGS
Filed May 26, 1922   3 Sheets-Sheet 3
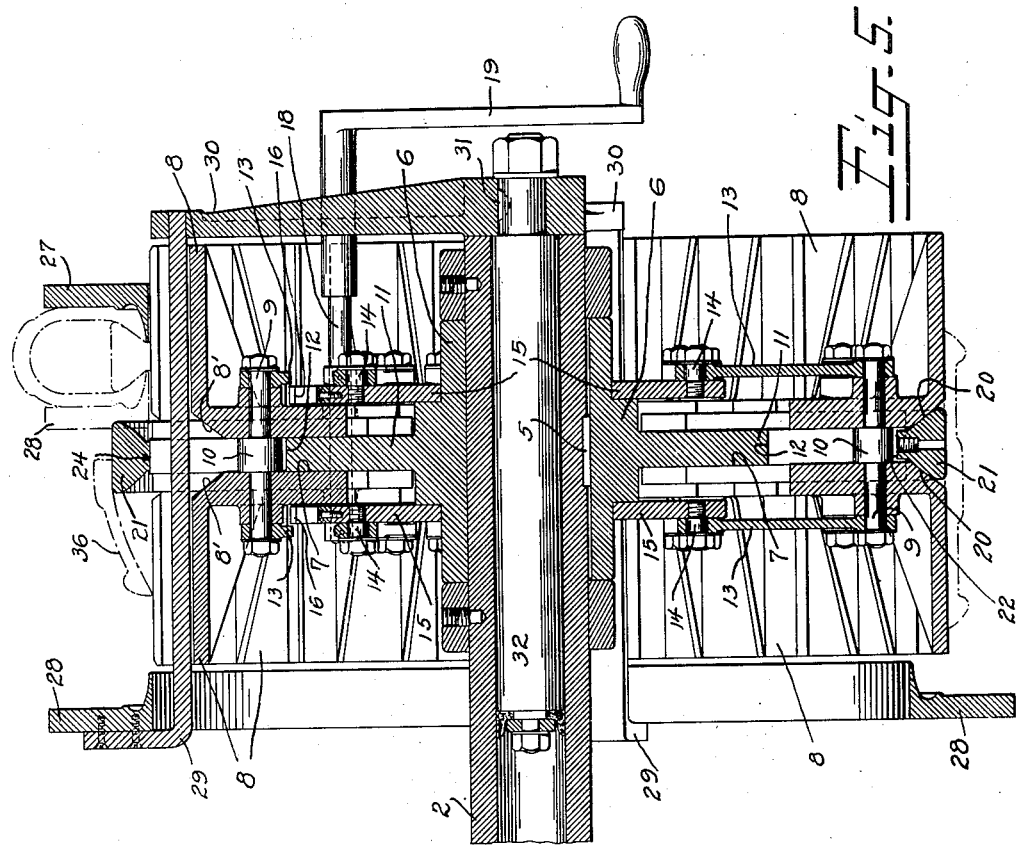
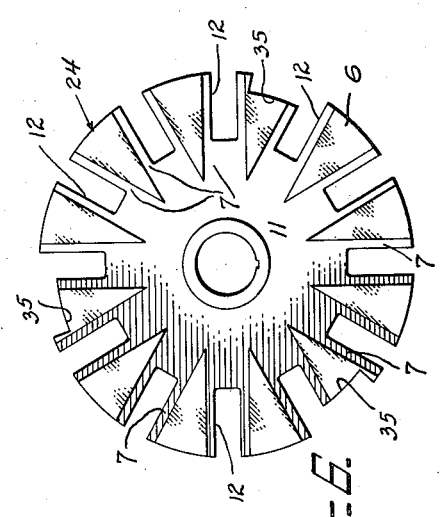
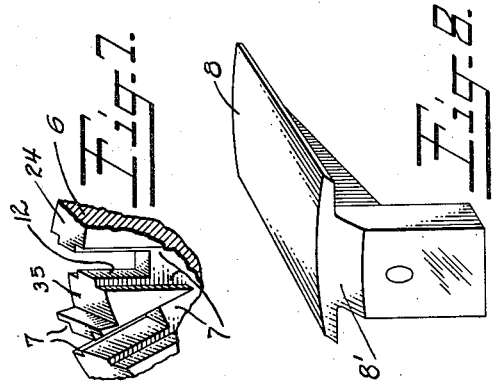
Inventor
William J. Steinle
By his Attorney
Ernest Hopkinson Patented Oct. 16, 1923.

1,470,889

UNITED STATES PATENT OFFICE.

WILLIAM J. STEINLE, OF FLUSHING, NEW YORK, ASSIGNOR TO THE HARTFORD RUBBER WORKS COMPANY, A CORPORATION OF CONNECTICUT.

APPARATUS FOR MANUFACTURING TIRE CASINGS.

Application filed May 26, 1922. Serial No. 563,767.

*To all whom it may concern:*

Be it known that I, WILLIAM J. STEINLE, a citizen of the United States, residing at Flushing, Long Island, county of Queens, and State of New York, have invented certain new and useful Improvements in Apparatus for Manufacturing Tire Casings, of which the following is a full, clear, and exact description.

This invention relates to the manufacture of tire casings for motor vehicles, and particularly, an apparatus for their building and shaping.

In a recently filed application, I have disclosed a method of manufacturing casings by the "pulley-band process," which embraces the building of the plies of stress-resisting-elements and rubber composition into a flat form and at a diameter greater than that of the beads of the finished casing, i. e., oversize, preferably in such a way as to allow tensioned margins of the casing to form the flat band crescent-shaped when freed or removed from the drum. Subsequently, according to the method previously disclosed, the crescent-shaped band is formed to approximately tire shape in various ways, one and the preferred way being to effect the shaping between presser plates or members which function like the platens of a press to fold the nearly cylindrical band annularly and progressively from its margins towards its center, thereby increasing the girth and decreasing the width of the band while shaping it to approximately tire form without air or other fluid pressure. This invention relates to a machine or apparatus for permitting the tire to be built flat, then bowed, and then shaped purely mechanically (without a differential pressure bulging its center radially outward) in situ, whereby to facilitate and cheapen the practice of the process mentioned, and also to economize in floor space in factories.

Without unnecessary limiting intention, my invention may be briefly said to consist in a collapsible drum adapted to demountably support an annular ring intermediate the edges of its building surface, the sections of the drum being shiftable from an expanded position, in which they define a substantially complete cylinder, to a contracted position, in which some of the sections are substantially flush with the periphery of a supporting plate for the annular ring, this same plate slidably supporting the sections as well. Two presser members in the form of upstanding flanged rings are arranged relative the drum so as to permit at least one of them being shifted transversely over the contracted drum and over the supporting plate, whereby to form the casing—after it has been built in the form of a flat band and self-condensed marginally to a crescent shape by collapsing the drum—approximately to tire form and to seat its margins either upon, or against the sides of, an annular ring that has been mounted on the periphery of the supporting plate, and preferably, that has constituted a part of the building surface of the drum in the assemblage of the raw materials for the casing into band form.

Other objects of the invention will appear in the following detailed description of an embodiment thereof illustrated in the accompanying drawings in which:—

Fig. 1 is a front elevation of the apparatus of my invention,

Fig. 2 is a side elevation of the building drum proper, showing the same in shaping position in its upper half and in building position in its lower half, Fig. 3 is a plan view of an annular sealing-ring, Fig. 4 is a plan view of a demountable presser member, Fig. 5 is a section of the building drum on the line 5—5, Fig. 2, Fig. 6 is a base view of a supporting plate for the movable sections of the drum, Fig. 7 is a perspective view of a portion of the supporting plate, showing the configuration of the guideways in the plate, And Fig. 8 is a perspective view of one of the drum sections.

According to my invention, I journal in a stand or frame 1, a hollow shaft 2 with an overhanging or free projecting portion upon which is mounted the collapsible building drum and press-shaping mechanism proper. The hollow shaft 2 may be rotated at will at any suitable speed by any convenient form of mechanism, such as that disclosed in a patent to H. V. Lough, No. 1,409,222, granted March 14th, 1922, controls being provided, as indicated at 3 and 4, to that end.

Keyed to the hollow shaft 2, as indicated at 5, is a supporting plate 6, whose details of construction are best illustrated in Figs. 6 and 7 of the drawings. As therein shown, the supporting plate is machined to provide a number of guideways 7 on each of its opposite sides for a plurality of sections 8 of the bracket type illustrated in Fig. 8. These sections are clamped together in pairs with a bolt 9, which is provided with a spacing collar or roller 10, to insure against binding upon the web portion 11 of the supporting plate. The web 11 is notched, or slotted, as indicated at 12, to pass the bolts 9, and permit shifting the sections of the drum more or less radially. Links 13 are hinged at one end to the bolts 9 at each side of the web 11, at their other ends being articulated to crank pins 14, which are fixed to a disk 15, movably sustained by the supporting plate 6. The crank pins 14 are grouped in pairs within radial lines connecting the axis of the drum with the axes of the bolts 9, to which their respective links are connected at their outer ends. This provides a desirable toggle action so that the circumferentially longer drum sections are moved outwardly a short distance before being moved inwardly to clear the circumferentially shorter drum sections, which are simultaneously moved inwardly in the operation of collapsing the drum to diminish its girth. This will be obvious from a scrutiny of Fig. 2 of the drawings, the lower half thereof illustrating the drum sections in their expanded or building position, and the upper half, the same in their contracted or shaping position. It will be noticed that in their expanded position, all the drum sections lie in substantially a cylindrical surface and practically render its surface continuous whereas in the contracted or collapsed position of the parts, the circumferentially longer drum sections lie in a cylindrical surface of less girth and the circumferentially short drum sections occupy a position still nearer the axis of the drum. The disk 15 may be operated in any suitable manner, preferably, as shown, by fixing to it racks 16 with which co-operate pinions 17 on a stud shaft 18 adapted to be turned by a crank 19.

A groove 20 for the reception of an annular ring 21 is provided intermediately of the drum by slabbing off, as indicated at 8', the inner margins of the several drum sections, these sections, it will be remembered, being spaced apart to slide on opposite sides of the web 11. The lugs 22, with which the ring 21 is usually equipped, are adapted to enter the notches 12 in the supporting plate, and the relatively long arcuate surfaces 23, between the lugs 22, are adapted to engage with the peripheral surfaces 24 of the supporting plate 6. It will be understood, of course, that the fitting of the annular ring 21 to the periphery of the supporting plate 6 is loose, and not snug or tight, so as to allow of readily positioning, or removing, the annular ring 21 on, or from, the periphery of the plate.

Three or more of the longer drum sections 8 are preferably provided with angular slots 25 for the reception of lugs 26 of a presser member 27, which is thereby readily attached in fixed position, or demounted from the drum, when the latter has been collapsed as shown in the upper half of Fig. 2. A corresponding, but oppositely faced, presser member 28 is normally supported at one side of the building drum, as shown in Fig. 1. These members may be of any suitable shape in cross-section but preferably are formed in cross-section as illustrated in the drawings, particularly Fig. 5. The shiftable presser member 28 may be supported and operated in any suitable manner, preferably as shown, by three or more bars 29 extending transversely of the drum from its inner side adjacent the stand 1 to its outer side where they are fixed in the ends of arms 30, keyed, as at 31, to the end of a piston 32 in the hollow shaft 2, and adapted to be operated by fluid under pressure supplied through the valve-controlled line 33, and exhausted through the valve-controlled line 34. To permit collapse of the sections of the drum without interference or obstruction by the bars 29, the latter are adapted to be swung or rotated clear of the path traveled by the shorter drum sections 8, and for this purpose, the central supporting plate 6 is cut away, as indicated at 35 in Figs. 2, 6 and 7, of the drawings.

In the use of the machine of the present invention, the drum sections 8 are collapsed and the annular ring 21 slipped transversely over the outside or free sections of the drum and seated upon the periphery of the supporting plate 6. Then the drum is fully expanded with the crank 19, through the pinions 17 and racks 16 turning the disk 15 to cause the crank pins 14 to move from the position shown in the upper half of Fig. 2, to the position shown in the lower half thereof. Thereby, the building surfaces of the sections 8 are brought into substantially flush relation with the outer surface of the annular ring 21, if it is of the sealing type illustrated. The operator then plies up his fabric and rubber composition into band form. In the process for which this apparatus is especially intended, he incorporates either temporary or permanent contracting elements or beads in the margins of the casing for condensing the fabric at its edges as fully disclosed in my method application previously mentioned. After the band has been formed flat with or without the rubber tread, as may be desired, the operator collapses the drum so that its sections are moved to the position shown in the upper half of Fig. 2. This allows the casing to take the crescent-shaped form indicated at 36 at the upper left of Fig. 5, by reason of the incorporated contracting members or beads in its margins, and brings the outer surfaces of the longer drum sections 8 into substantially flush relation with the inner periphery 23 of the annular ring 21, whose lugs 22 are free to be moved from their position in the notches 12 over the space left vacant by inward movement of the short sections 8 of the drum. Thereafter, the operator picks up the presser member 27 and attaches it to the contracted drum by inserting its lugs 26 in the angular notches 25 provided in certain of the longer sections of the drum. Having thus fixed one of the presser members to the contracted drum, fluid under pressure is then supplied through the valve-controlled line 33 to the piston 32 so as to move it partly out of the end of the hollow shaft 2, thereby carrying the arms 30, bars 29, and second presser member 28, to the position shown in dotted lines in Figs. 1 and 5. In this shifting movement, the band, or casing, guided by the longer of the drum sections, is folded outwardly and annularly, first adjacent its margins. Continued shifting of the presser member 28, flattens out more and more of the margins of the casing and progressively enlarges the annular folding so as to increase the girth of the band and decrease its width, ultimately changing it to approximately tire form, as indicated in Fig. 5, with the inside of its beaded margins pressed against and cemented to the beveled walls of the annular ring 21. In a short time, after the cement has dried, the presser member 28 is manually pulled upon to restore it and the piston 32 to the position shown in solid lines in Fig. 5, the exhaust line 34 being opened to facilitate this manual operation. Then, the relatively stationary presser member 27 is detached from the drum and removed to allow the shaped casing, supported at its margins on the sealing-ring, to be removed and subsequently treated, as desired, finally, of course, being introduced into a mold and cured in a manner well known.

The casing is preferably built up, as shown in Figs. 1 and 5, nearer one edge of the drum than the other in such a position as to permit mounting the stationary presser member 27, but also and particularly, allowing the remote bead of the casing, which engages the movable pusher plate 28, a sufficient amount of freedom to turn over and be properly engaged with the inclined face of the annular sealing-ring 21.

In the drawings, I have illustrated the apparatus as employed in connection with the manufacture of a clincher casing that is to be cured with a fluid under pressure in direct contact with its interior. It is to be understood, however, that the apparatus may be used for manufacturing straight-side casings as well as clinchers, that by obvious changes it may be utilized in preparatorily shaping either type of casing for curing on a collapsible metallic core, or upon an air bag, and that not only may the annular ring 21 be variously shaped, but that many minor changes may be made in details of construction without departing from the principles of the present invention. Reference should therefore be made to the accompanying claims for an understanding of the scope of the invention.

Having thus described my invention, what I claim and desire to protect by Letters Patent is:

1. In an apparatus for manufacturing tire casings for motor vehicles, a collapsible drum upon which a casing may be assembled in band form, and means for shaping the band from the flat to approximately tire form in situ on the drum when collapsed.

2. In an apparatus for manufacturing tire casings for motor vehicles, a collapsible drum upon which the casing may be assembled in band form, and means for shaping the band from the flat to approximately tire form without removal from the drum including presser members whose opposed faces are adapted to be engaged with the margins and a substantial portion of the side walls of the casing.

3. In an apparatus for manufacturing tire casings for motor vehicles, a collapsible building drum, and a tire shaping press having presser members at least one of which is mountable on the drum when collapsed.

4. In an apparatus for manufacturing tire casings for motor vehicles, a building drum with a plurality of sections, means for collapsibly supporting the sections, and a pair of presser members one of which is movable transversely of the drum and the other of which is demountably secured to the drum when collapsed.

5. In an apparatus for manufacturing tire casings for motor vehicles, a building drum having collapsible sections, in combination with presser members one of which is detachably secured to the drum when collapsed and the other of which is supported coaxially of the drum and shiftable transversely of the face thereof.

6. In an apparatus for manufacturing tire casings for motor vehicles, a collapsible building drum, an annular ring adapted to be demountably supported by the drum, and a shaping mechanism including presser members one of which is shiftable transversely of the drum and the other adapted to be attached to the drum when collapsed.

7. In an apparatus for manufacturing tire casings for motor vehicles, a collapsible building drum, an annular ring adapted to be demountably supported intermediately of the drum and substantially flush therewith when expanded, and a shaping mechanism including presser members one of which is shiftable transversely of the drum and the other adapted to be attached to the drum when collapsed.

8. In an apparatus for manufacturing tire casings for motor vehicles, a collapsible building drum having a series of sections shaped to define an annular groove intermediately of the drum's periphery, an annular ring adapted to be mounted in the groove sections, means for shifting the sections of the drum from a position substantially flush with the annular ring to a contracted position relative thereto, and tire shaping mechanism including a pair of presser members one of which at least is attachable to the drum at one side when contracted and the other of which is adapted to be shifted transversely of the drum.

9. In an apparatus for manufacturing tire casings for motor vehicles, a collapsible building drum having a series of sections, means shiftably supporting the sections whereby to permit contraction of the drum, in combination with a tire shaping mechanism including a presser member attachable at one side of the drum when contracted and a second tire pressing member supported co-axially with the drum and shiftable transversely of the sections when contracted.

10. In an apparatus for manufacturing tire casings for motor vehicles, a collapsible building drum, a tire shaping press, and co-axial supporting means for both by which the former may be rotated and through which the latter may be operated to press oppositely upon the margins of a band.

11. In an apparatus for manufacturing tire casings for motor vehicles, a collapsible building drum having a series of sections defining a substantially continuous cylindrical surface when expanded, a notched circular support in which said sections are slidably mounted, a circular disk revolvable relative to said notched support, and links operatively connecting said sections and disk whereby upon relative movement of the disk and circular support the sections may be shifted.

12. In an apparatus for manufacturing tire casings for motor vehicles, a collapsible building drum having a series of sections defining a substantially complete cylindrical surface when expanded, a notched circular support in which said sections are slidably mounted, a circular disk revolvable relative to said notched support, and links so connected to said sections and said disk as to permit differentially moving adjacent sections whereby to contract the drum.

13. In an apparatus for manufacturing tire casings for motor vehicles, a collapsible drum with a plurality of sections, means for shifting the sections to reduce the girth of the drum and thereby define with certain of the sections a bead supporting and ring guiding surface, said sections being provided intermediately with an annular groove, a ring adapted to be located in said groove when the sections are expanded and to be passed over and guided by certain of the sections when the drum is contracted, in combination with a shaping machine having presser members at least one of which is shiftable transversely of the drum when it is contracted.

14. In an apparatus for manufacturing tire casings for motor vehicles, a collapsible drum with a plurality of sections, means for shifting the sections to reduce the girth of the drum and thereby define with certain of the sections a bead supporting and ring guiding surface, said sections being provided intermediately with an annular groove, a ring adapted to be seated in said groove when the sections are expanded and to be passed over and guided by certain of the sections when the drum is contracted, in combination with a shaping machine having presser members at least one of which is shiftable transversely and the other of which is adapted to be attached to the sections of the drum when contracted, said sections being provided with angular slots.

15. In a machine for manufacturing tire casings for motor vehicles, a collapsible drum having a plurality of sections shiftable to vary its girth, in combination with a shaping press including a presser member readily fixed to the drum at one side of its periphery, a second presser member normally supported in an unobstructing position to one side of the drum, radially disposed arms at the opposite side of the drum for supporting the second presser member, and means located within the series of sections of the drum for shifting the arms and carrying the second presser member towards the first-mentioned one.

16. In an apparatus for manufacturing tire casings for motor vehicles, a rotatable shaft, a notched supporting plate fixed thereto, a plurality of sections slidably mounted on the plate, a member supported co-axially of the shaft, means for relatively moving the member and supporting plate, links articulated to each of said sections and the member, some of the links being connected to the member at one side of radii through their pivotal connections with the sections, and the remainder of the links being connected with the member at the opposite side of a similar radii whereby upon relative movement of the member and supporting plate some of the sections will be moved radially outward and then inwardly when the drum is contracted while the remainder of the sections will be moved radially inward and to a greater extent.

17. In an apparatus for manufacturing tire casings for motor vehicles, a collapsible building drum having a plurality of sections, a supporting plate provided with guides in which the sections are slidably supported, a member carrying a plurality of crank pins corresponding in number to the sections, links pivoted to the sections and operatively connecting the same with each of the crank pins, the axes of pairs of said crank pins being located within contiguous radii through the pivotal connections of their links with adjacent sections.

18. In an apparatus for manufacturing tire casings for motor vehicles, a collapsible drum having a plurality of sections shiftable from an expanded position substantially defining a cylindrical surface to a contracted position in which some of the sections define a less complete cylindrical surface of smaller diameter and the remainder of the sections are disposed still further inwardly, means for radially shifting the sections to locate them as defined, said sections being shaped to provide a groove for the reception of an annular ring intermediately of the edges of the drum, an annular ring of a diameter and shape permitting it to pass over and be guided by certain of the sections when the drum is collapsed, presser members fixed and shiftable respectively to the sections of the drum when collapsed, means for supporting and operating the shiftable presser member transversely of the drum, said last named means permitting of limited rotation of the shiftable presser member whereby its supporting means may be moved to a position not interfering with inward radial movement of the sections of the drum when it is collapsed.

19. In an apparatus for manufacturing tire casings for motor vehicles, a rotatable shaft, a supporting plate secured thereto, a plurality of sections slidably supported in the sides of said plate, an annular ring adapted to seat upon the periphery of said plate, means for shifting the sections from a position in which certain of them are substantially flush with the periphery of said plate to a position in which all of the sections define a substantially cylindrical surface of greater girth than the plate, in combination with a press shaping mechanism including presser members adapted to be fixed and shifted respectively relative to the sections when adjusted in a position substantially flush with the periphery of the supporting plate.

Signed at New York, in the county of New York, and State of New York, this 24 day of May, 1922.

WILLIAM J. STEINLE.